United States Patent [19]
Fuss

[11] 3,932,569
[45] Jan. 13, 1976

[54] METHOD FOR PRODUCING FREE-FLOW INTERLOCKING FOAMED PACKING MATERIAL

[75] Inventor: Gunter G. Fuss, Daly City, Calif.

[73] Assignee: Free-Flow Packaging Corporation, Redwood City, Calif.

[22] Filed: July 12, 1974

[21] Appl. No.: 487,901

Related U.S. Application Data

[60] Division of Ser. No. 321,657, Jan. 8, 1973, Pat. No. 3,855,053, which is a continuation-in-part of Ser. No. 221,974, Jan. 31, 1972, abandoned.

[52] U.S. Cl. ................. 264/51; 264/50; 264/53; 264/150; 264/209; 264/DIG. 5
[51] Int. Cl.² ................. B29D 23/04; B29D 27/00
[58] Field of Search ......... 264/51, 53, 54, 321, 209, 264/150; 156/244, 292, 296, 298

[56] References Cited
UNITED STATES PATENTS

| | | | |
|---|---|---|---|
| 3,238,565 | 3/1966 | Jacobs | 264/321 UX |
| 3,481,455 | 12/1969 | Graham et al. | 264/54 X |
| 3,632,705 | 1/1972 | Makowski | 264/51 |
| 3,723,237 | 3/1973 | Fuss | 264/51 X |
| 3,795,729 | 3/1974 | Asakura et al. | 264/54 |
| 3,804,684 | 4/1974 | Tokushige et al. | 264/48 X |
| 3,806,567 | 4/1974 | Graham et al. | 264/48 X |
| 3,855,053 | 12/1974 | Fuss | 264/51 X |

Primary Examiner—Philip Anderson
Attorney, Agent, or Firm—Flehr, Hohbach, Test, Albritton & Herbert

[57] ABSTRACT

An improved method for the manufacture of free-flow packing material particularly characterized by its ability to isolate packed items and to absorb the energy of potentially destructive shocks and impacts. The method produces individual units of the packing material which are structurally in the form of elongate flat "bows," wherein two self-adhered layers of foamed expanded plastic material form a central portion of the "bow" and curved outward extensions of these layers form two oppositely extending flat loops. The flat bow-shaped units are individually of a size and shape to provide a desired free-flowing characteristic, and are formed of a foamed expanded crushable plastic material which inherently possesses a shock absorbing characteristic. The method can be carried out, alternatively, by squeezing a single heat-softened tube to effect internal contact and adherence, or by bringing two adjacent heat-softened tubes into engagement to effect external contact and adherence, followed successively by cooling and slicing through the walls of the tube to form relatively shallow bow-shaped units. The resulting aligned flat loops and centrally adhered midsection of the bows cooperate to provide unusually shape stable packing units without detracting from the shock absorbing characteristics of a mass of such packing units.

7 Claims, 14 Drawing Figures

METHOD FOR PRODUCING FREE-FLOW INTERLOCKING FOAMED PACKING MATERIAL

CROSS-REFERENCE TO RELATED APPLICATION

This application is a division of my copending application Ser. No. 321,657, filed Jan. 8, 1973 now U.S. Pat. No. 3,855,053, which, in turn, is a continuation-in-part of application Ser. No. 221,974, filed Jan. 31, 1972, now abandoned.

BACKGROUND OF INVENTION

This invention relates generally to methods and means for producing free-flow, loose-fill packaging materials, and more specifically to a method for producing a particular improved form of such packing materials.

The present invention improves on the methods and means for producing packaging materials, as disclosed in Graham and Stanley U.S. Pat. No. 3,481,455, Makowski U.S. Pat. No. 3,632,705, and copending application Ser. No. 82,697, filed Oct. 21, 1970, by Arthur Graham, Alexander G. Makowski and Gunter G. Fuss (now abandoned).

SUMMARY OF INVENTION AND OBJECTS

Generally stated, the present invention is directed to an improved method for producing free-flow, interlocking, foamed expanded plastic packaging material wherein the individual units are formed from at least two layers of foamed expanded plastic material which are fused or adhered to one another at a central portion and which extend outwardly to provide oppositely extending flat ribbon-like loops. The loop portions are of substantially equal size and extend in opposite directions from the centrally adhered section to provide a final configuration which generally resembles a bow. The resultant bow configuration has been found to provide a unique resistance to shape degradation in the presence of dynamic and/or static loading which provides a multidirectional resistance to collapse and/or deformation in the presence of destructive or damaging external forces, such as shock, impact, continuous loading or vibration.

The present invention is particularly directed to a method and means for the continuous manufacture of free-flow, interlocking packing units of the type described. The method generally comprises the initial steps of heating an expandable plastic material to a plastic or heat softened stage, and continuously extruding the heat softened plastic material to form one or more elongated hollow tubes. According to one embodiment of the method, a single elongate, heat-softened tube is engaged in such fashion as to deform opposite sides of the tube inwardly to effect internal contact and adherence of the internal tube surfaces, followed successively by cooling and slicing through the walls of the elongate tube to form relatively shallow bow shaped units. In another embodiment of the method, two adjacent heat-softened tubes are engaged in such fashion as to bring the tubes together to effect external contact and adherence of the external tube surfaces, followed by cooling and slicing to form the bow shaped units. In either case, the slicing cut to form the units may be at right angles to the crimped tube (or adjacent tubes) to form right angle bows. Alternatively, the slicing cut may be at a shallow angle to the axis of the tube or tubes (i.e., 15° to 45°) for forming relatively shallow, angle cut bows. The severed bow-shaped units are heat expanded to effect a gradual enlargement of the bow configuration to achieve a desired expanded configuration (see FIGS. 1 and 8). As noted, the final expanded configuration of the bow-shaped units provides an unusual degree of shape stability to the units when used as a shock absorbing free-flowing mass of the units.

It is an object of the present invention therefore to provide a method for producing a free-flow, interlocking packing material in a particular desired form, such form providing enhanced shape stability to individual packing units while at the same time providing enhanced energy or shock absorbing characteristics to the individual units and to the material from which the packing units are formed.

Another object of the invention is to provide a method and means for the continuous manufacture of improved packing materials of the type described.

Another object of the invention is to provide a novel procedure for extruding, compressing, slicing and severing hollow foamed expanded plastic materials to continuously form improved packing units of the character described.

A particular object of the invention is to provide a novel procedure for forming foamed expanded units of the character described wherein the foamed structure is initially stretched while in a heat-softened tubular form, following which adjacent layers of the tubular material are adhered to one another and then cooled, sliced and severed so as to form individual packing units in a desired bow-shaped configuration.

Still another object of the invention is to provide a method and means for making foamed expanded packing uninits of the character described which is readily adapted to machine-type production line techniques.

Additional objects and advantages of the present invention will appear from the following description in which preferred embodiments have been set forth in detail in conjunction with the accompanying drawing.

BRIEF DESCRIPTION OF THE DRAWINGS

FIG. 5 is an enlarged view in side elevation of the crimping means useful in the apparatus of FIG. 4.

FIGS. 6A, B and C are enlarged detail views in top plan, section and side elevation of the slicing means of FIG. 4.

FIGS. 7A, B and C are enlarged view of a unit of packing material produced according to the method of the present invention, illustrating particular features thereof.

DESCRIPTION OF PREFERRED EMBODIMENT

Figures 1, 2, 3, 4:
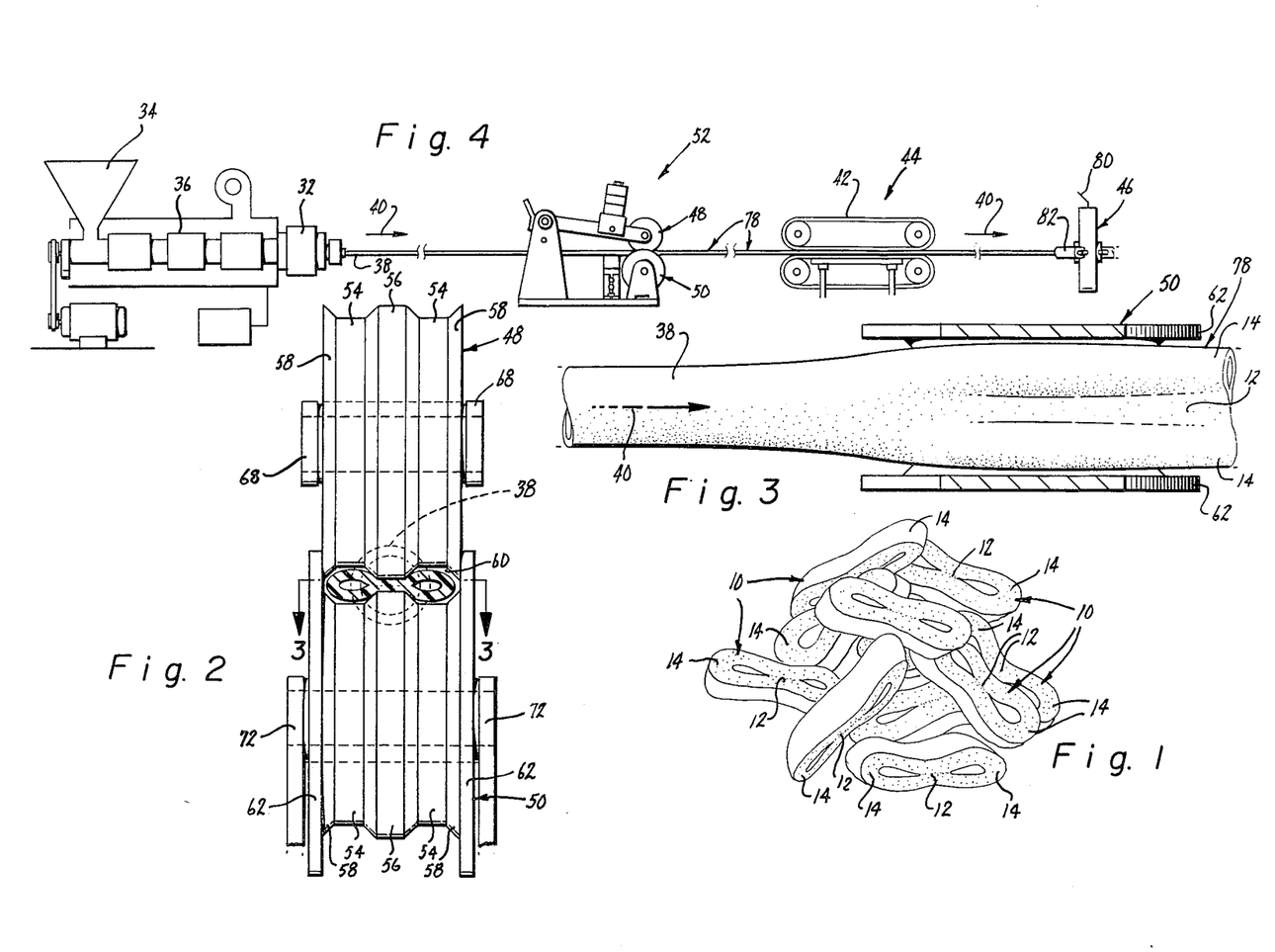
FIG. 1 is a view in perspective of a quantity of packing material embodying the bow configuration produced by the method of the present invention.
FIG. 2 is a view in end elevation of a crimping method and apparatus useful in the method for producing the packing units as illustrated in FIG. 1.
FIG. 3 is a view in horizontal section along the line 3—3 of FIG. 2.
FIG. 4 is a reduced schematic representation of a system of apparatus for carrying out the method of the present invention.

FIG. 1 illustrates one embodiment of the improved packing material produced by the method of the present invention wherein the individual units of packing material are designated by reference numeral 10. As shown in this view, and in FIG. 7, each packing unit 10 is formed as an elongate relatively flat continuous ribbon of foamed expanded plastic material, wherein portions of the continuous ribbon are in contact and self-adhered to one another at a central portion 12 to form continuous oppositely extending flat loop portions 14. As particularly shown in FIG. 7, side portions or faces 16 on opposite sides of the unit are essentially flat or planar and are substantially parallel to one another. In a preferred embodiment, as particularly illustrated in FIGS. 1 and 7, the side faces 16 are cut at a slight angle as respects the axes of the loops 14, as represented by the angle 18 in FIG. 7A. The resultant bow-shaped configuration of the packing units, as will be more fully explained hereinafter, provides each packing unit with a shape stability or resistance to shape degradation which renders the units particularly effective in a packing mass. Specifically, the loop portions 14 have an enhanced resistance to permanent deformation in directions perpendicular to the axes through the loops, as represented at 20 (see FIG. 7). In addition, in a mass of the packing units, the described bow-shape of the individual packing units 10 provides a unique multi-directional characteristic of shock absorption without collapse or permanent deformation, in the presence of vibration, impacts and other destructive forces normally encountered in shipping and handling of packaged items.

As best seen in FIGS. 1 and 7, the described construction of the packing units 10 insures a degree of controlled deformation or collapse in virtually any direction perpendicular to the axes 20 through the loops 14 (see arrows 22, FIG. 7). In like fashion, the packing units 10 provide a high degree of shock absorption and resistance to collapse as respects static or dynamic loading in directions perpendicular to the planes of the faces 16 (see arrows 24, FIG. 7). In addition, as hereinafter explained, the loops 14 and the openings therein promote a relatively high degree of interlocking between adjacent packing units in the packing mass to thereby not only provide a relatively firm cushioning support but also an unusual degree of resistance to migration of a packed item through the packing mass. On the other hand, the self-contained bow configuration, comprising the centrally adhered portions 12 and loops 14, contributes to a desired "flowability" of the packing mass. This latter characteristic permits a packing mass to be poured into recesses and openings of oddly shaped items and within the confines of a shipping carton, to isolate the packed item from the sides of the carton. In commercial practice, pouring or filling operations of the type described can be performed rapidly and efficiently with automatic machinery, or by means of unskilled hand labor.

In accordance with the present invention, the individual packing units 10 are formed of a foamed expanded plastic of sufficient internal strength to be essentially shape-retaining or self-sustaining during normal handling, but capable of crushing or permanent deformation in response to potentially damaging shocks, or continued vibration. In preferred embodiments, the foam is characterized by an essentially cellular structure (unicellular or interconnecting) having a volume of cells or void spaces ranging from about 25 percent to as much as 85 percent of the total volume of the units. When an appropriate resin is selected to make the expanded plastic foam, the described highly porous foam structure possesses both a desired initial stiffness and resilience and an essential characteristic of crushability provided by the void spaces within the expanded foam, which imparts a latent crushability or shock absorbing characteristic to interior portions of the plastic material itself. This characteristic of internal crushability supplements the special characteristics imparted to the packing units 10 by their unique structure or shape. Thus, as noted, the individual packing units 10 possess an unusual three dimensional resistance to collapse, or to deformation through crushing, except when subjected to potentially damaging forces or shocks.

Expanded plastic foams particularly suited to carrying out the method of the present invention include both thermoplastic and thermosetting resinous materials. Because they are more easily processed into the desired shapes, thermoplastic resins are generally to be preferred and include specifically the alkenyl, aromatic polymers as disclosed in U.S. Pat. No. 3,066,382, and the aliphatic olefin polymers as disclosed in U.S. Pat. No. 3,251,728. These thermoplastic materials (in either modified or unmodified form) are customarily employed in conjunction with suitable foaming and nucleating agents. Thermosetting resins adapted for use in the present invention include foamed polyester resins such as the polyurethane foams (i.e., derived from isocyanate resins) and specifically the more rigid polyurethane foams made from relatively highly branched resins. Blowing or foaming agents can be advantageously used with the thermosetting resins, as more specifically disclosed in the Makowski U.S. Pat. No. 3,632,705.

Regardless of the particular plastic material employed, it is essential in carrying out the present invention that the packing units, in their foamed expanded state, possess the desired cellular structure and the desired proportion of void spaces with respect to the total volume. Thus, the formulation of the plastic materials should be very carefully controlled to provide foamed expanded plastics of desired essential characteristics, for example: desired cell sizes (i.e., ranging from 0.001 to 0.1 inch), a desired proportion of void spaces to the total volume (i.e., ranging from at least 25 percent to no more than 85 percent), a desired foam density (i.e., ranging from about 0.3 to about 4.5 pounds per cubic foot), and other essential characteristics as hereinafter specified.

In one procedure adapted to the present invention, elongated plastic tubes are extruded through an extrusion device which effects an initial chemical expansion of an expandable thermoplastic extrusion mass. Such an extrusion device is schematically illustrated at 30 in FIGS. 4 and 5, wherein the extruder head is represented at 32. In general, the extrusion apparatus including the extruder head 32 is employed in conjunction with conventional auxiliary equipment including a hopper 34 and feed chamber 36 which are adapted to cooperate with an extruder screw or other pressure device (not shown) which forces a liquid or heat-softened plastic mixture through an annular passage or extrusion outlet as a substantially hollow elongated plastic tube. One particularly satisfactory method and apparatus for producing elongated hollow plastic tubes in this fashion is specifically disclosed in the aforementioned Makowski U.S. Pat. No. 3,632,705. As therein disclosed, elongate hollow tubes of foamed expanded plastic are continuously extruded from the extrusion apparatus, as represented by the elongate tube 38 in FIGS. 4 and 5. In the ambient atmosphere, the heat-softened plastic material quickly cools to a set stage, thereby facilitating frictional engagement of the tube 38 to pull it away from the extrusion apparatus (arrow 40). In a preferred operation of the apparatus, the tube 38 is pulled away from the extrusion apparatus at a rate appreciably faster than the heat-softened plastic material is extruded from the extrusion apparatus. The effect is to longitudinally stretch the heat-softened material to thereby longitudinally orient gas pockets and void spaces (cells) formed within the walls of the tube. Such longitudinal orientation of the cells provides an expansion capability to severed sections of the tube 38 so that upon subsequent heating of the thermoplastic material, the expansion is substantially greater in a radial direction than along the axes of the severed units.

As particularly illustrated in FIG. 4, the elongate tube 38 is frictionally engaged by endless belts or other friction devices 42 forming part of a pulling mechanism 44. A variable drive for the belts causes the extruded tube 38 to be continuously pulled from the extrusion apparatus at a rate ranging from 5 to 58 times the normal extrusion rate, to cause the described cell elongation. The pulling action of the belts also causes the tube 38 to be continuously pulled into the zone of operation of slicing and severing means, generally represented at 46.

Figures 5, 6A, 6B, 6C, 7A, 7B, 7C:
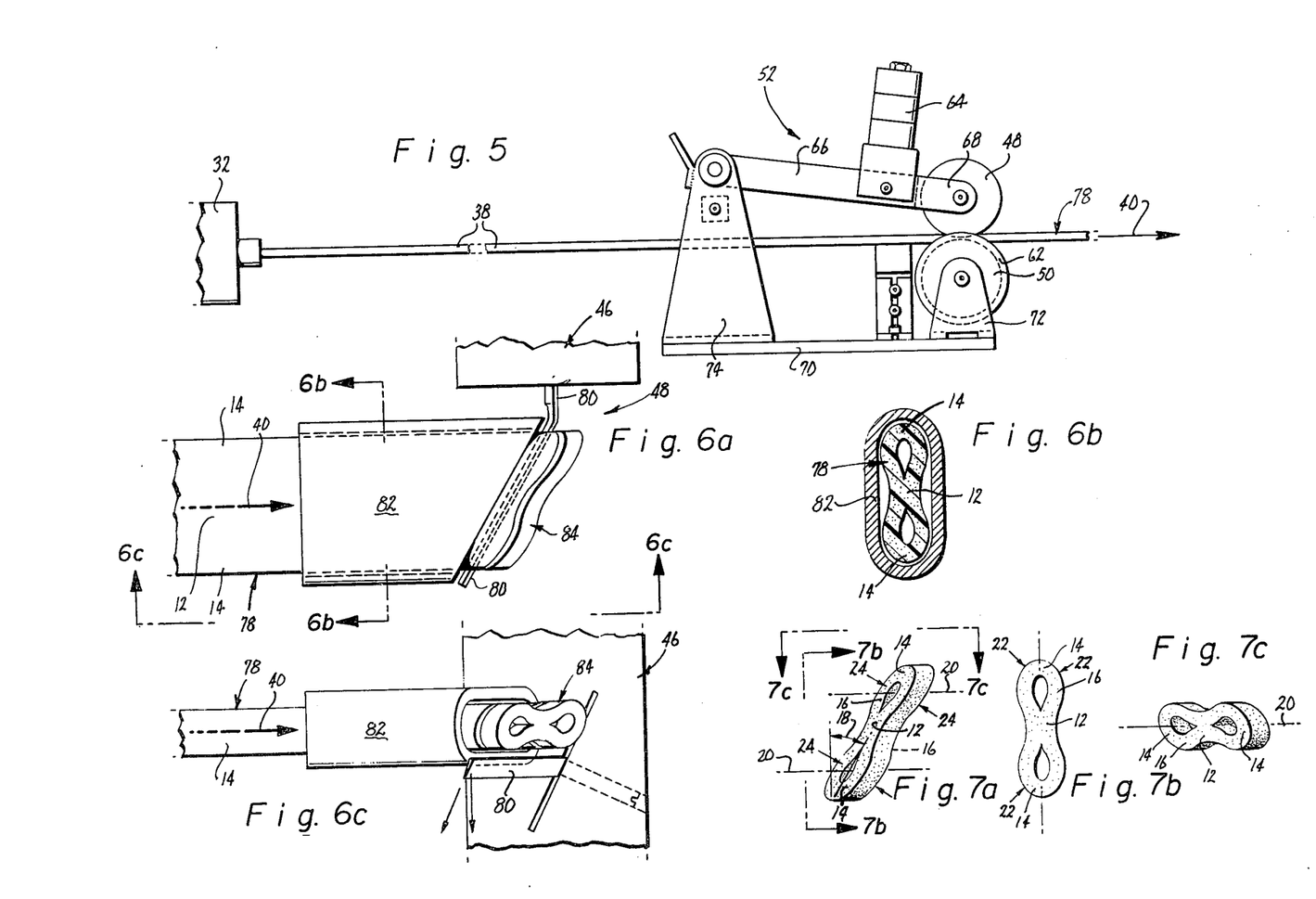

FIGS. 4 and 5 also illustrate the operation of crimping wheels 48 and 50 at a crimping or squeezing device 52 to compress the hollow heat-softened extruded tube 38 at a central portion and thereby form the central self-adhered portion 12 of the packing units 10. The operation of the crimping device 52 to squeeze or pinch the tube 38 into the desired bow-shaped cross section is illustrated in detail in FIGS. 2 and 3. Thus, as particularly shown in FIGS. 2, the crimping wheels 48 and 50 are provided with cooperating exterior surfaces including recesses or grooves 54 separated by an annular ridge 56. The crimping wheels are also provided with mating rim portions 58 which serve to confine the space between the opposing grooves 54 at a zone of compression or squeezing, represented in FIG. 2 at 60. Desirably the upper crimping wheel 48 is held in rotary alignment within the guide discs 62 of the lower crimping wheel 50 (see FIG. 3).

FIG. 5 illustrates the sequential operations of extruding a hollow heat-softened plastic tube 38 and pulling the same in the direction of arrow 40 through the wheels 48 and 50 of the crimping device 52. As shown in FIG. 5, the upper crimping wheel can be forced downward against the surface of the lower crimping wheel 50, within the confines of the guide disc 56, by any suitable means such as the weights 64. As illustrated in FIG. 5, the weights 64 are carried on a pivotally mounted lever or support arm 66 having a bifurcated end 68 to receive the crimping wheel 48. A suitable support mounting 70 can be conveniently provided to carry the mounting brackets 72 for the lower crimping wheel 50 as well as the upstanding bracket support 74 for the lever arm 66. It will be understood that the bracket mounting 74 provides a spaced opening for passage of the crimped flattened tube 38, generally represented in FIGS. 5 and 6 at 78.

Referring again to FIGS. 2 and 3, the crimping wheels 48 and 50 cooperate in mating fashion to apply squeezing forces from diametrically opposed sides of the heat-softened tube 38, and thereby to cause the inner surfaces of the upper and lower portions of the tube wall to engage one another and become self-adhered in a central pressure zone between the ridges 56 of the crimping wheels. For this operation to be successful, it is necessary that the tube 38 be somewhat cooled from the extrusion temperature so as to have a proper free standing consistency, but to be insufficiently cooled to prevent self-adherence in the central pressure area of the compression zone 60. In practice, it has been found that the crimping apparatus 52 should be positioned at a substantial distance from the extrusion head, say, three to five feet, but not so far as to provide complete solidification of the tube 38 sufficient to prevent self-adherence in the pressure zone. As a practical matter, at linear extrusion speeds of the order of 25 to 280 feet per minutes (as disclosed in said Makowski U.S. Pat. No. 3,632,705), it has been found that position of the crimping device at a distance of about three to eight feet from the extrusion head will normally be satisfactory, with an operational range within a distance of about two to ten feet from the extrusion head.

Following the crimping operation at 52, the flattened crimped tube 78 is pulled by the pulling device into the zone of cutting and slicing mechanism 46. During the interval of passage from the crimping device 52 to the severing device 46, the tube 78 cools and solidifies sufficiently to permit slicing and severing of the individual units 84 of desired configuration, as particularly illustrated in FIG. 6. As shown in the separate views A, B, and C of this figure, the rotary slicing knife 80 cooperates with a tube guide 82 to sever relatively shallow segments of the flattened crimped tube 78. The resulting severed units (identified at 84 in FIG. 6) are employed in the production of packing units having the desired bow configuration.

Packing units of final desired expanded shape and configuration (see FIGS. 1 and 7) are obtained by progressive expansion of the sliced and severed units 84 in the presence of heat. The desired progressive expansion occurs normally with the resins, nucleating and expanding agents customarily employed in carrying out the manufacturing procedures of the present invention. For example, it is possible to employ various foamable, thermoplastic polymers, including any of the resinous alkenyl aromatic polymers or aliphatic olefin polymers disclosed in U.S. Pat. Nos. 3,066,382 or 3,251,728, or resins of similar characteristics. As noted, these resins are customarily employed in conjunction with volatile organic foaming or expanding agents which are uniformly distributed throughout the polymers. To achieve a desired foam structure characterized by an essentially cellular structure (unicellular or interconnecting) it is also desirable that the polymer incorporate or be intermixed with a suitable nucleating agent. Although the proportion of foaming and nucleating agents will vary somewhat with the particular resinous material employed, the proportions should be such that the plastic in a foamed expanded state will possess a desired cellular structure having a desired proportion of void spaces with respect to total volume. Specifically, the formulation of the thermoplastic materials should be very carefully controlled to provide foamed expanded plastics having desired essential characteristics after the initial extrusion and expansion, for example, cell sizes within the range from about 0.001 to 0.1 inch, void spaces ranging from at least 25 percent to no more than 85 percent of the total extruded volume and an initial foam density within the range from about 1 to no more than 12 pounds per cubic foot. When cooled to ambient temperatures, the extruded foam should also possess sufficient internal strength to retain the characteristics of a rigid foam during normal handling, but be capable of expansion upon being heated to achieve foam densities preferably below about 1 pound per cubic foot and within the range from about 0.3 to 1.5 pounds per cubic foot.

As is hereinafter noted, the ability of the plastic foams processed in accordance with the present invention to achieve the desired foam structures and densities is dependent upon the ability of the foam structure to accommodate the longitudinal stretching and orientation of the cells within the foams during the initial or extrusion stage of formation of the foams.

Alkenyl aromatic polymers useful as the thermoplastic resins herein generally comprise, in chemically combined form, at least about 70 percent by weight of at least one alkenyl aromatic compound having the general formula:

wherein "Ar" represents an aromatic hydrocarbon of the benzene series, and "R" is hydrogen or the methyl radical. Examples of such alkenyl aromatic polymers are homopolymers of styrene, alphamethyl styrene, ortho-, meta-, and para-ethyl styrene, ar-ethylstyrene, and ar-chlorostyrene; the copolymers of two or more of such alkenyl aromatic compounds with one another; and copolymers of one or more of such alkenyl aromatic compounds with minor amounts of other readily polymerizable olefinic compounds such as divinylbenzene, methylmethacrylate, or acrylonitrile, etc.

With thermoplastic resins of the above type (e.g., foamable and expandable polystyrene), the usual practice is to incorporate a foaming agent as a uniform dispersion distributed throughout the resin. Typical foaming agents which may be employed for this purpose are known in the art, for example, as disclosed in U.S. Pat. Nos. 2,941,964; 2,983,692; and 3,344,215 and also in H. R. Lasman, "Foaming Agents," *Modern Plastics Encyclopedia* 381 (1968–1969). Suitable foaming agents include low boiling aliphatic hydrocarbons such as pentane, hexane, heptane, and butanes; low boiling halohydrocarbons, e.g., fluorinated hydrocarbons sold under the trademark "Freon" by E. I. duPont deNemours, Wilmington, Dela., carbon tetrachloride, chloromethanes, -ethanes, -propanes and -butanes; low boiling petroleum ethers; inert gases such as carbon dioxide, and other gases hereinafter noted; and mixtures of the above. These foaming agents are incorporated within the thermoplastic polymer or resinous material.

Foam structures according to the present invention should have a thermoplastic cellular character capable of being heated and expanded to achieve a desired low foam density and in the cooled rigid state should possess a desired characteristic of crushability. To insure the obtaining of foam structures of desired characteristics, nucleating agents are preferably employed. In the case of the alkenyl aromatic polymers (e.g., polystyrene) many conventional nucleating agents are known as disclosed, for example, in U.S. Pat. No. 3,344,215 and in Naturman, L.I., "How to Select Blowing Agents for Thermoplastics," Plastics Technology 43 (October 1969). Such nucleating agents include combinations of an acid, suitable organic acids such as malonic, citric, phthalic, and fumaric acid, with carbon dioxide-liberating compounds such as sodium and potassium bicarbonate. Combinations such as sodium citrate and sodium bicarbonate are also suitable for use. Other suitable nucleating agents functioning like "boiling chips" include finely divided resin, barium sulfate lithopane, clay, talc, diatomaceous earth and pigments as disclosed in the Naturman article. Still further nucleating agents which may be used are combinations of nitrogen liberating compounds with finely divided solids as disclosed in U.S. Pat. No. 3,344,215. The aforementioned nucleating agents are incorporated with the extrusion material in a desired proportion, for example, by gravity feed into the hopper for the extrusion apparatus, or by tumbling with beads or pellets of solid polymer feed. The nucleating agents generally perform the function of insuring a uniform distribution of cells during the initial extrusion processing to produce a foamed plastic.

In general the foaming and nucleating agents are present in amounts sufficient to provide a cellular foam which will be rigid on cooling to the set stage but which will have a desired characteristic of crushability. In practice the proportion of these agents will vary somewhat with the particular resin employed. In the case of a polystyrene resin employing a dispersed pentane or dichlorodifluoromethane expanding agent, the expanding agent may range from about 5 to 15 percent by weight of the extrusion mixture. The proportion of citric acid and sodium bicarbonate as nucleating agents may range from 0.3 to about 2 percent of the extrusion mixture. A typical proportion is 0.4 percent citric acid and 0.5 percent sodium bicarbonate for a total of 0.9 percent of the nucleating agent to the total extrusion mixture. Other agents may also be employed to obtain a uniform dispersion of these agents. For example, a small amount of a cooking oil may be used as a wetting agent to achieve a uniform coating of plastic pellets with sodium bicarbonate.

When aliphatic olefin polymers are used in making the free-flow packing units of the present invention, such polymers are normally solid polymers. Satisfactory polymers may be obtained by polymerizing at least one alpha-mono-olefinic aliphatic hydrocarbon containing from 2 to 8 carbon atoms, such as ethylene, propylene, butene-1, pentene-1, 3-methylbutene-1, 4-methylpentene-1, 4-methylhexene-1, or 5-methylhexene-1, alone, with one another, or with various other polymerizable compounds. Foamed expanded polymers of ethylene or propylene alone are highly satisfactory and produce desired foam structures which are chemically inert. Polymerizable organic compounds which can be polymerized with ethylene or propylene include vinyl acetate, $C_1$–$C_4$ alkyl acrylates such as ethyl acrylate, styrene, lower alkyl esters or methacrylic acid such as methyl methacrylate, tetrafluoroethylene and acrylonitrile.

The expanding or foaming agents employed with the aliphatic olefin polymers may be selected from a wide group of normally gaseous or volatile liquids. Indicated expanding and foaming agents include nitrogen, argon, neon, helium, acetylene, ammonia, butadiene, carbon dioxide, cyclopropane, dimethylamine, 2,2-dimethylpropane, ethane, ethylamine, ethylene, isobutane, isobutylene, monomethylamine, propane, pentane, propylene, and trimethylamine, certain of the halogen derivatives of methane and ethane, such as chlorodifluoromethane, dichlorodifluoromethane, dichlorofluoromethane, trichlorofluoromethane, difluorotetrachloroethane, 1,1-difluoroethane, trichlorofluoromethane, and particularly 1,1-dichlorotetrafluoroethane and 1, 2-dichlorotetrafluoroethane.

The dichlorotetrafluoroethanes have been found to be particularly effective as foaming agents for making foamed bodies from normally solid aliphatic olefin polymers when employed in accordance with the present invention in amounts to about 0.2 to 1.0 percent by weight of the aliphatic olefin polymers. Again the precise amount of expanding or foaming agent employed will depend in large measure on the particular aliphatic olefin polymer used in the extrusion process. In general, among the aliphatic olefin polymers, foamed expanded polyethylene and polypropylene resins based on initial resins of molecular weight 250 to 400,000 are to be preferred.

In accordance with the procedure particularly disclosed and described in the Makowski U.S. Pat. No. 3,632,705, the individual segments 84 sliced and severed by the device 46 fall onto a first set of conveyers where they are subjected to continued cooling and aging, during which gas pressures and temperatures within the cellular structure of the foam are equalized with that of the ambient atmosphere. In a typical operation, the severed units 84 are held for approximately four hours on belt conveyers (or in bins), following which they are passed to further conveyers which move through a first expansion unit, wherein they are subjected to the action of atmospheric steam at about 212°F for a period of the order of about 60 seconds. The product issuing from this first expansion unit is then fed continuously to a second set of holding conveyers, and again subjected to aging or holding at atmospheric conditions for a period of approximately four hours (again to permit the outside air to penetrate the cells and to relieve the partial vacuum created by the cooling). Thereafter, the cooled equalized units are fed to a second stage expansion unit where they are again subjected to atmospheric steam at 212°F for an additional 60 seconds. The twice expanded product is in the form generally represented by the packing units illustrated in FIGS. 1 and 7.

The expansion of the crimped severed units 84 produces packing units 10 which have optimum characteristics for use as a free flow packing mass. Specifically, the bow-shape of the units 10 is such that a unique three dimensional shock absorptive characteristic is achieved. This shock absorptive characteristic, which has been previously described, is obtained by the ability of the end loops 14 to flatten under normal and continuing compressive forces to absorb either static or dynamic loading as achieved by packing and handling forces, impacts, vibration and like forces. These forces can be exerted in the direction of the arrows 22, in FIG. 7, or in the direction of the arrows 24, thus providing the three dimensional response to shocks and impacts.

Figures 8, 9, 10:
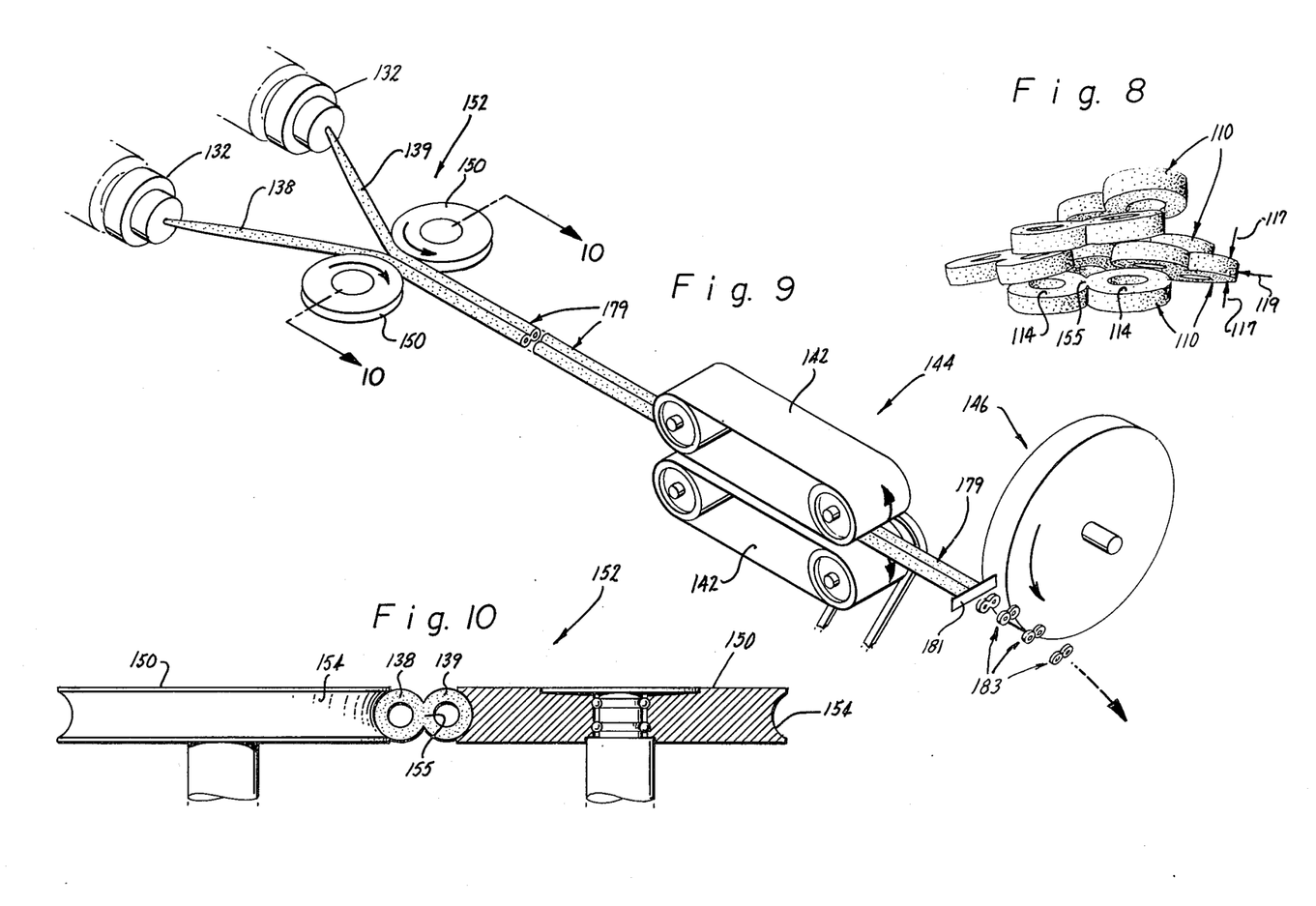
FIG. 8 is a view in perspective, similar to FIG. 1, of another embodiment of packing material embodying the bow configuration as produced by the method of the present invention.
FIG. 9 is a view in perspective of a crimping procedure and apparatus useful in carrying out the method for producing the packing units as illustrated in FIG. 8.
FIG. 10 is an enlarged view in section along the line 10—10 of FIG. 9.

FIG. 8 illustrates another embodiment of the improved material produced by the method of the invention wherein the characteristic bow configuration of the individual packing units is obtained by a slight modification of the processing. Thus, spaced apart extrusion heads 132 are employed to simultaneously force a heat softened plastic material through the extrusion orifices as separate, spaced apart substantially hollow plastic tubes 138 and 139. These tubes are pulled away from the extrusion apparatus in the manner previously described, by the friction members 142 of the pulling mechanism 144. The effect is to longitudinally stretch the heat-softened material to thereby longitudinally orient the gas cells within the walls of the tubes, in the manner previously described. In this instance, however, the tubes are engaged by the horizontally aligned members of a crimping device 152, which serve to squeeze the separate tubes 138 and 139 together for self-adherence at the point or line of contact. Thus, as particularly shown in FIG. 10, the crimping means 152 comprises spaced apart crimping wheels 150 which have cooperating recesses or grooves 154. These grooved surfaces serve to engage the outer surfaces of the heat-softened tubes 138 and 139 and to squeeze the tubes together to cause self-adherence at a central zone of contact represented at 155. For this operation, it is essential that the tubes 138 and 139 be somewhat cooled from extrusion temperature, so as to be self-supporting, but insufficiently cooled to prevent self-adherence in the central pressure area or compression zone 155. As a practical matter, it has been found satisfactory to have the crimping device 150 spaced at a distance of 3 to 5 feet from the extrusion heads 132 to insure obtaining the desired bow configuration illustrated in FIG. 10. Thus, as in the previously described system, for linear extrusion speeds of the order of 25 to 280 feet per minutes, the crimping device 150 should be positioned about 3 to 8 feet from the extrusion heads 132, with operation ranges existing within a distance of about 2 to 10 feet from the extrusion heads.

Following the self-adherence of the tubes 138 and 139 into a single biaxial tube 179, the pulling device 144 causes such tube to be pulled into the zone of operation of the cutting and slicing mechanism 146, for severing operations as generally illustrated in the right hand portion of FIG. 9. During the interval of passage from the crimping device 152 to the severing device 146, the biaxial tube 179 cools and solidifies sufficiently to insure effective operation of the rotary slicing knife 181 to obtain the bow shaped units generally represented at 183. The resulting severed units are ultimately employed in the production of expanded packing units having the desired bow configuration.

The severing device 181 illustrated in FIG. 9 effects severing cuts which are perpendicular to the parallel hollow axes of the biaxial tube 179. As a result the packing units 183 are formed with substantially parallel side portions which intersect planes tangential to the looped end portions of the units, at an angle of approximately 90°. It will be appreciated, however, that the severing knife 181 can be angled as in the previously described embodiment to provide angled slicing cuts, for example, ranging from about 15° to 45° as respects the parallel axes of the tube 179. The resulting packing units have a slant configuration similar to that previously described and illustrated, for example, in FIGS. 1 and 7.

It is a feature of the processing as illustrated and described in conjunction with FIGS. 8 to 10, that bow-shaped packing units can be formed in either a partially expanded configuration (illustrated in FIG. 9), or in a totally unexpanded configuration. To carry out the processing for the latter purpose, the tubes 138 and 139 are cooled immediately following extrusion, for example by a stream of chilled gas or liquid, as they emerge from the extrusion heads 132. By way of illustration, a stream of low temperature water or chilled air could be sprayed on the material emerging from the extrusion heads, to cause solidification approximately simultaneously with the fusing of the tubes in the zone 133. The immediate purpose of such operation is to achieve a minimum emergence expansion of the material adjacent the extrusion heads 132. The ultimate purpose is to provide an unexpanded material which occupies a minimum of space during shipment to the user, following which the user can expand the units to desired size in accordance with the general technique of steam expansion previously described. Since shipping costs are generally related to volume as well as weight, such processing can achieve substantial economies for the shipper.

In general, expansion of the crimped severed units 183 produces packing units 110 (see FIG. 9) which have desired optimum characteristics for use as a free-flowing packing mass. Thus, the characteristic bow shape of the units is effective to obtain the unique three-dimensional shock absorptive characteristic previously described in connection with the units 10. This shock absorptive characteristic is obtained by the ability of the end loops (represented at 114 in FIG. 8) to flatten under normal and continuing compressive forces, to absorb the static or dynamic loading achieved by impacts, vibration and like destructive forces. Such forces are generally represented by the arrows 117 and 119 in FIG. 8, and illustrate the three-dimensional response to shock and impacts made possible with the bow-shaped units.

It has been determined that the packing units produced by the method of the present invention, as represented either at 10 in FIG. 1 or at 110 in FIG. 8, are characterized by a greater degree of resistance to permanent deformation of shape degradation than previously available packing units of similar character. Thus, it has been particularly determined that the bow configuration can be initially used in a packing mass, with little change in character, and thereafter re-used in subsequent packing operations and masses with no appreciable loss in essential protective characteristics. Of course, in the presence of extreme or destructive forces, the individual units (i.e., 10 or 110) will undergo substantial deformation of shape, within either the material of the central portion (12 or 155) of the end loops (14 or 114) to absorb the shock and prevent damage or destruction of the packed item. Consequently, in a mass of the packing units, the described characteristics provide a unique cumulative effect in protecting a packed item from damage or breakage which, however, does not detract from the free-flowing characteristic of the units during packing and unpacking. The bow configuration of the packing units consequently comes close to providing the ideal configuration for a packing unit, which is designed to be essentially shape-retaining yet crushable, and also free-flowing.

The packing units 10, or the packing units 110, also provide a series of outwardly facing loops, represented at 14 or 114, respectively, which particularly adapt the individual units to interlocking contacts with other like units in a packing mass. Accordingly, a mass of the packing units not only serves to immovably position a packed item within a shipping carton but also to achieve a maximum resistance to migration or movement of the packed item due to multiple impacts or vibration during shipment or handling operation. These characteristics, coupled with the described "flowability" of the units, provide a highly utilitarian material for a wide variety of packing operations.

From the foregoing, it will be evident that the present invention makes possible the production of highly effective, efficient packing materials particularly adapted to the packing of various fragile items and components such as electronic and optical equipment, lenses, radio tubes, glassware, art objects, etc., as well as various other items. The improved packing material has proved particularly effective in the packing of items of delicate nature, which can be rendered useless because of changed position, alignment or adjustment of the parts. Such changes may frequently occur in normal shipment due to constant vibration of the item against the wall of the container, without any visible breakage occurring. In particular, the multi-directional shock absorbing characteristics of the packing materials of the present invention provide an unusually high degree of energy absorption through permanent deformation in the presence of abnormal or potentially destructive forces or impacts, which serve to efficiently cushion and protect the packed item.

To those skilled in the art to which this invention relates, many variations in its application and in the specific procedures described therein will be readily apparent. For example, the successive angle cuts to slice and sever the units can easily be combined with more than one longitudinal slicing cut, to provide modified packing units having highly desired characteristics. While the products of such processing would differ from the preferred embodiment herein disclosed, they would still have useful properties for packing operations. The described and like variations in the processing are clearly within the scope of the present invention. It should be understood, therefore, that the disclosures herein are intended to be purely illustrative and not in any way limiting.

I claim:

1. In a method for the continuous manufacture of free-flow interlocking foamed expanded plastic material, the steps of extruding expanded plastic material to form at least one elongate hollow tube, continuously engaging outer surfaces thereof while still in a heat-softened state due to the heat of extrusion to cause adjacent tube wall surfaces to engage and adhere to one another only in a central zone as respects the cross section thereof so as to provide a cross-sectional configuration wherein central portions of the tube walls are adhered to one another at said central zone and outer portions are in the form of contiguous open hollow loops extending outwardly from said central zone, cooling said adhered portions and successively slicing through the tube walls substantially laterally to the tube axis at intervals to sever shallow lengths of partially expanded plastic material having substantially the configuration of a shallow bow.

2. A method as in claim 1 wherein a single elongate hollow extruded tube is engaged on diametrically opposite external surfaces to deform and cause inner surfaces thereof to engage and adhere to one another while still in said heat-softened state.

3. A method as in claim 2 wherein a pair of elongate hollow heat-softened tubes are extruded adjacent one another, and said pair of tubes is engaged to cause adjacent external surfaces to engage and adhere to one another while still in said heat-softened state.

4. A method as in claim 3 wherein said adhered heat-softened hollow tubes are cooled by quenching in a liquid medium of reduced temperature.

5. A method for the continuous manufacture of free-flow interlocking foamed expanded plastic packing material, said method being characterized by the steps of extruding expanded plastic material in the form of an elongate hollow tube, continuously engaging diametrically opposite external surfaces of said tube and deforming said diametrically opposed surfaces inwardly to cause portions only of the inner surfaces of the tube wall to engage while still in a heat-softened state due to the heat of extrusion, whereby said portions of the inner surfaces of said inwardly depressed tube wall adhere to one another only in a central zone as respects to the cross section of said tube, and thereafter successively slicing through the wall of said tube including said adhered portions to continuously sever lengths of sliced tube, said slicing being substantially lateral to the tube axis and at intervals to effect severing of relatively shallow lengths of tube, and thereafter heating the severed lengths of tube to expand adhered tube portions in said central zone and unadhered tube portions laterally outward thereof to obtain open hollow expanded plastic foam units substantially in the configuration of a shallow bow.

6. A method as in claim 5 wherein said heating and expanding of the severed lengths of said tube is carried out in stages with intermediate holding periods.

7. A method as in claim 5 wherein said slicing through the walls of the tube is carried out at an angle of the order of 15° to 45° as respects the axis of the tube.

* * * * *